United States Patent Office 3,390,732
Patented July 2, 1968

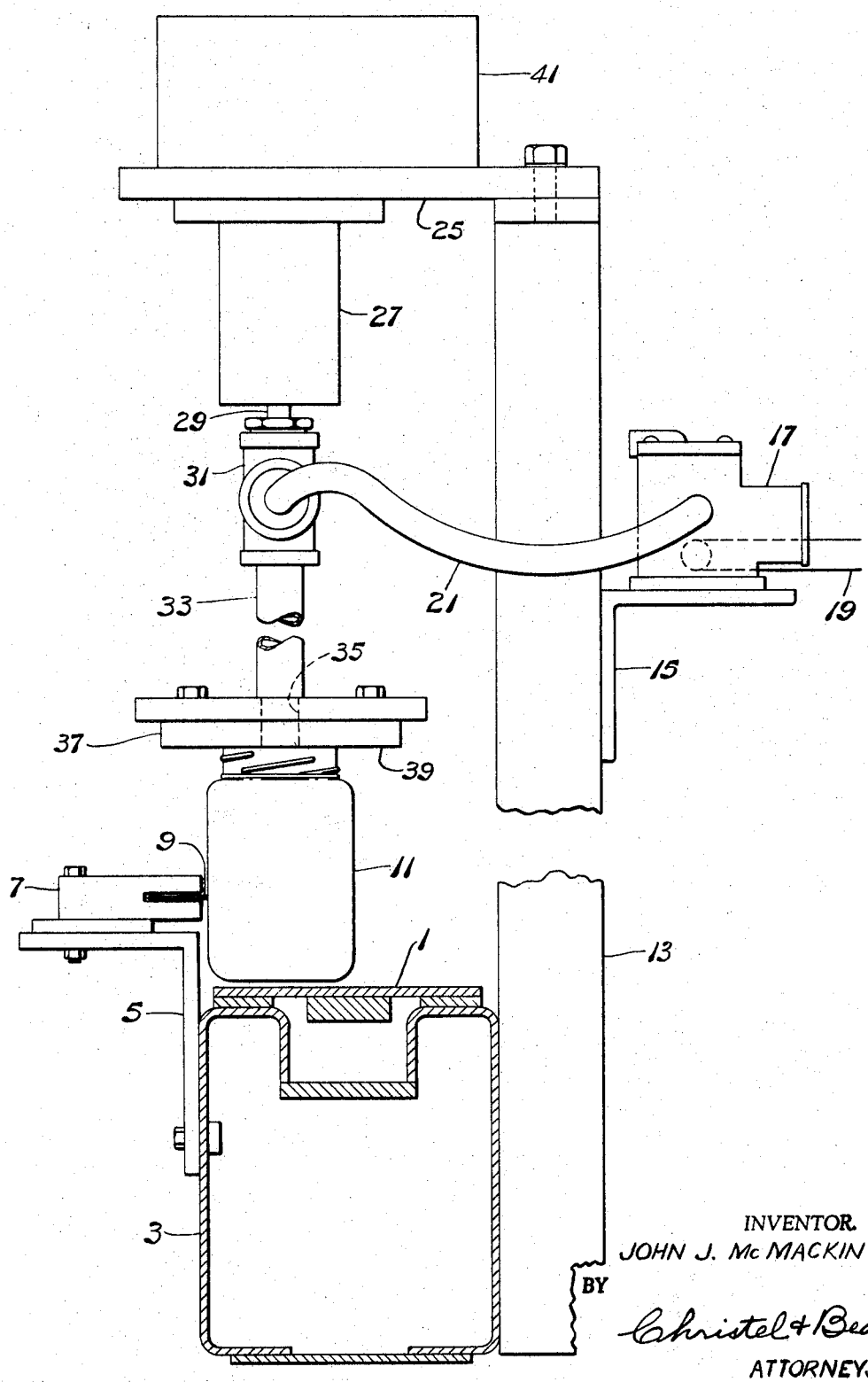

3,390,732
MEANS FOR AUTOMATICALLY WEIGHING GLASS CONTAINERS
John J. McMackin, Brockway, Pa., assignor to Brockway Glass Company, Inc., Brockway, Pa.
Filed Mar. 11, 1966, Ser. No. 533,709
6 Claims. (Cl. 177—53)

ABSTRACT OF THE DISCLOSURE

Apparatus for automatically weighing open-mouth glass containers moving along a conveyor, the weighing device including a flat member disposed just above the upper ends of the containers and having a vacuum opening therethrough. A triggering switch actuated by individual containers reaching the weighing station energizes the vaccum opening which lifts the container from the conveyor up to the flat member which is the movable part of a weighing mechanism. The triggering switch includes a time-delay relay which cuts off the vacuum and drops the container back to the conveyor belt after weighing has been completed.

---

This invention relates to apparatus for weighing open-mouth glass containers and in particular to apparatus for automatically weighing such containers as they advance along a conveyor during or subsequent to manufacture thereof.

In present-day manufacture of containers, conveyors carry the containers more or less continuously through various manufacturing and inspection steps and various methods of weighing the containers as a part of the inspection and quality control process have been employed. Accurate high speed weighing is of substantial importance and various problems and difficulties occur in methods now employed for this purpose, including excessive handling, lack of sufficient accuracy, time lost in the weighing process, undue complexity, and damage to containers.

It is an object of the present invention to provide apparatus for automatically weighing containers as they advance along a conveyor by lifting and weighing the containers in a single mechanical step and replacing them on the conveyor with a minimum of handling and without the use of gripping or clamping devices, thereby minimizing the danger of breakage or other damage to the containers.

It is an object of the present invention to provide a weighing apparatus of the foregoing characteristics having minimal physical contact with the container wherein only the top surface portion of the container mouth contacts the weighing apparatus.

It is another object of the present invention to provide a weighing apparatus of the foregoing characteristics which minimizes movement of the container incident to the weighing operation. In the preferred form, containers of average size are raised and lowered approximately one-sixteenth inch relative to the conveyor during the weighing process, thereby substantially reducing the danger of fouling the conveyor system and damaging containers due to mishandling thereof.

It is a further object of the instant invention to provide a weighing apparatus of the foregoing characteristics utilizing a vacuum system for lifting the containers from a conveyor into abutting engagement with a plate member suspended from a weight sensor for weighing the containers by such suspension and replacing the containers on the conveyor by venting the vacuum line to release a container and permit it to drop back onto the conveyor. The dropping distance is so small as to preclude damage to the container or misorientation thereof.

While a single specific embodiment of the principles of the present invention is illustrated in the accompanying drawing and described in detail in the following specification, it is to be understood that such embodiment is by way example only and that various mechanical modifications may be made without departing from the spirit of the invention, the scope of which is limited only as defined in the appended claims.

The single figure of the drawing is an elevational view, partly in cross section of one form of weighing apparatus illustrative of the present invention.

With reference to the drawing, the numeral 1 denotes a conventional horizontal conveyor belt supported on a fixed base 3 having an upstanding bracket 5 connected to one side of the base which carries a switch 7. Switch 7 has an operating member 9 projecting over the top of conveyor 1 which is adapted to be engaged by containers moving along the conveyor. Contact with containers 11 as the latter advance into inspection position moves member 9 actuating switch 7 and completing a circuit which actuates a vacuum system which lifts and weighs successive containers as hereinafter described.

An upright support 13 is secured to the other side of base 3 and has a bracket 15 secured intermediate the ends thereof, providing a horizontal support for a solenoid operated vacuum valve 17. Valve 17 forms a portion of a vacuum system operating in response to signals received from switch 7 to supply sub-atmospheric pressure from a supply line 19 to a flexible hose 21.

A horizontal support plate 25 is secured to the top of support member 13 and projects over the bottle carrying conveyor system 1. A weighing device 27 depends from support plate 25 and may be a conventional spring balance or a strain gauge type weighing device, either being of well known construction.

The weighing device 27 includes a vertically movable weight responsive sensor rod 29. A container engaging device is suspended from weight sensor 29 and comprises a rod having its lower end supporting a pipe fitting 31 which may comprise an ordinary T. Fitting 31 receives hose 21 and is threaded at its lower end with the upper end of a tubular member 33. The lower end of tubular member 33 connects with a plate 37 having a flat undersurface 39, the horizontal extent of which is sufficient to cover the expanse of the top surface of the finish of the general run of open-mouth containers. An opening 35 in plate 39 forms a continuation of the vacuum line from member 33 to the bottom surface of plate 37. There is thus established a vacuum communication line between a container 11 and a vacuum source including vacuum line 19, valve 17, flexible hose 21, junction 31 and tubular member 33. When the plate 37 is disposed directly over an open-mouth container with the latter in registry with opening 35, energization of the vacuum source raises the container into abutting relation with bottom surface 39.

To raise the container from the conveyor and suspend it in weight sensing relation from weight sensor 29, the spacing between bottom surface 39 and the top surface of the container is preferably of the order of $\frac{1}{16}$ of an inch. The spacing must provide sufficient clearance as the containers advance on the conveyor toward the weighing position but must be close enough to develop a lifting force adequate to raise successive containers from the conveyor belt into engagement with under surface 39.

Reference numeral 41 denotes an electrical control box secured on plate 25 having suitable timing devices to control the duration of the vacuum lifting impulse, as by means of a time delay switch in circuit with switch 7, for a given length of time depending on the speed of response of the weighing device. A memory device may also be included in control box 31 for determining the subsequent path of the containers for sorting containers according to their weight. Individual containers of improper weight may merely be rejected by means of a suitable reject device such as that shown in Patent No. 2,902,151, dated Sept. 1, 1959, or they can be stored into various weight classifications and sent down multiple conveyor lines.

In operation, the containers are advanced on the conveyor and each bottle, in turn, contacts operating member 9 thereby actuating and completing a circuit which energizes solenoid vacuum valve 17 to admit a vacuum supply from the vacuum source through valve 17 and flexible hose 21, junction 31, tubular member 33, opening 35 and into a container 11. The lifting force thus developed causes the container to raise from the conveyor into abutting engagement with undersurface 39. This suspends the container from the weight sensor 29. After weighing has been effected air is admitted into the vacuum line 19 causing the container to drop back onto the conveyor for subsequent disposition.

Having thus described and illustrated a preferred embodiment of my invention, it will be understood that such description and illustration is by way of example only and that such modifications and changes as may suggest themselves to those skilled in the art are intended to fall within the scope of the present invention which is limited only by the scope of the appended claims.

What is claimed is:

1. Apparatus for automatically weighing open-mouth glass containers comprising a conveyor for advancing containers to a weighing station, a weighing device and means supporting the same above said conveyor at said station, a member suspended from said weighing device having a flat under surface closely spaced above open-mouth containers carried by said conveyor, said member having an opening in said flat under surface and means connecting said opening with a vacuum source, means responsive to the presence of a container in registry with said opening to activate said vacuum source for lifting a container up to and into abutting engagement with said flat under surface to suspend the container from said weighing device and automatically weigh the same.

2. Apparatus according to claim 1 wherein said weighing device comprises a fixed portion carried by said supporting means and a depending vertically movable weight responsive element, said member being carried by said depending element.

3. Apparatus according to claim 2 wherein a tubular conduit extends between said depending weight responsive element and said member, and a flexible vacuum conduit connecting with said tubular conduit.

4. Apparatus according to claim 2 including a vacuum source including a control valve and a flexible conduit connecting said source with said opening in the flat under surface of said member.

5. Apparatus according to claim 4 wherein the means responsive to the presence of a container in registry with said opening activates said vacuum source control valve.

6. Apparatus according to claim 1 wherein the spacing between the flat under surface of said member and the top surface of containers on said conveyor is of the order of $\frac{1}{16}$ of an inch.

References Cited

UNITED STATES PATENTS

| | | | |
|---|---|---|---|
| 1,904,720 | 4/1933 | Douglass. | |
| 2,581,742 | 1/1952 | Young. | |
| 2,606,658 | 8/1952 | Powell | 209—74 |
| 3,000,140 | 9/1961 | Fouse et al. | 177—50 X |
| 3,095,055 | 6/1963 | McLauchlan | 177—53 |

RICHARD B. WILKINSON, *Primary Examiner.*

G. H. MILLER, JR., *Assistant Examiner.*